US005478431A

United States Patent [19]

Aiazzi

[11] Patent Number: 5,478,431

[45] Date of Patent: Dec. 26, 1995

[54] MACHINE FOR AUTOMATICALLY FORMING HARD FOLDERS FOR BINDERY

[76] Inventor: Marco Aiazzi, Via Badia, 9, 50031 Barberino Di Mugello (FLorence), Italy

[21] Appl. No.: 303,402

[22] Filed: Sep. 9, 1994

[30] Foreign Application Priority Data

Sep. 10, 1993 [IT] Italy .................................... FI93A176

[51] Int. Cl.$^6$ ........................................................ B32B 3/04

[52] U.S. Cl. ........................ 156/479; 156/475; 156/477.1; 156/487; 156/556; 412/27

[58] Field of Search ..................................... 156/443, 446, 156/468, 475, 477.1, 479, 487, 556; 412/25, 26, 27, 901, 902

[56] References Cited

U.S. PATENT DOCUMENTS

| | | | |
|---|---|---|---|
| 3,804,694 | 4/1974 | Blair | 156/477.1 |
| 4,160,687 | 7/1979 | Spear | 156/444 |
| 4,248,657 | 2/1981 | Henry | 156/443 |

*Primary Examiner*—James Engel
*Assistant Examiner*—J. Sells
*Attorney, Agent, or Firm*—McGlew and Tuttle

[57] ABSTRACT

Machine for automatically forming hard folders for bindery, comprising:—means for individually feeding the folder's two mirror-sections and central backbone matched to the respective lining sheet—means for pressing each paired elements thus fed;—means for horizontally moving each pair thus pressed;—means for beating the first and then the second trasverse rim projecting from the lining sheet onto the trasverse edge of the corresponding cardboard mirror-section;—means for moving backwards the angular portion of each trasverse rim being beaten and protruding out of the corresponding cardboard mirror-section;—means for beating the protruding longitudinal rims of the lining sheet onto the corresponding sides of the cardboard mirror-sections and backbone;—means for pressing the said pair with the thus beaten rims of the lining sheet. (FIG. 1).

20 Claims, 5 Drawing Sheets

MACHINE FOR AUTOMATICALLY FORMING HARD FOLDERS FOR BINDERY

FIELD OF THE INVENTION

The present invention relates to a machine for the automatic formation of hard folders for bindery, that is, for the application of a coating or lining sheet on cardboard mirror-sections for the binding of books or similar paper-converting articles.

BACKGROUND OF THE INVENTION

It is known that the formation of a hard folder comprises, after the cutting of the cardboard into frames or mirror-sections and the preparation of a backbone, the glueing of the frames and the backbone on the lining material and the beating of the protruding trasverse and longitudinal rims of said lining inwardly of the folder. Afterwards, the same folder is pressed to allow for the maximum adhesion of the cardboard to the lining.

Also known are machines for automatically carrying out the above described operations.

But such machines are constructed to carry out a complex operating procedure and, therefore, have a very high manufacturing cost which is justifiable only for large productions.

SUMMARY AND OBJECTS OF THE INVENTION

The main object of the present invention is to provide a simpler and less costly machine.

This result has been achieved, according to the invention, by adopting the idea of making a machine which comprises:—means for individually feeding the folder's two frames and central backbone matched to the respective lining sheet;—means for pressing each pair thus fed;—means for horizontally moving each pair thus pressed;—means for beating the first and then the second trasverse rim projecting from the lining sheet onto the trasverse edge of the corresponding cardboard frame; means for moving backwards the angular portion of each trasverse rim being beaten and protruding out of the corresponding cardboard frame; means for beating the protruding longitudinal rims of the lining sheet onto the corresponding sides of the cardboard frames and backbone; means for pressing the said pair with the thus beaten rims of the lining sheet.

The advantages deriving from the present invention lie essentially in that a machine according to the invention is easy to build, reliable, cost-effective, and can be easily retrofitted to an automatic unit for the distribution of glueing over the lining sheet and the automatic positioning of the cardboard frames and backbone, so as to allow for a completely automatic and flexible production line able to produce hard coated folders of high quality and low unit cost.

BRIEF DESCRIPTION OF THE DRAWINGS

These and other advantages and characteristics of the invention will be best understood by anyone skilled in the art from a reading of the following description in conjunction with the attached drawings given as a practical exemplification of the invention, but not to be considered in a limitative sense, wherein.

DETAILED DESCRIPTION OF THE PREFERRED EMBODIMENT

Figure 1:
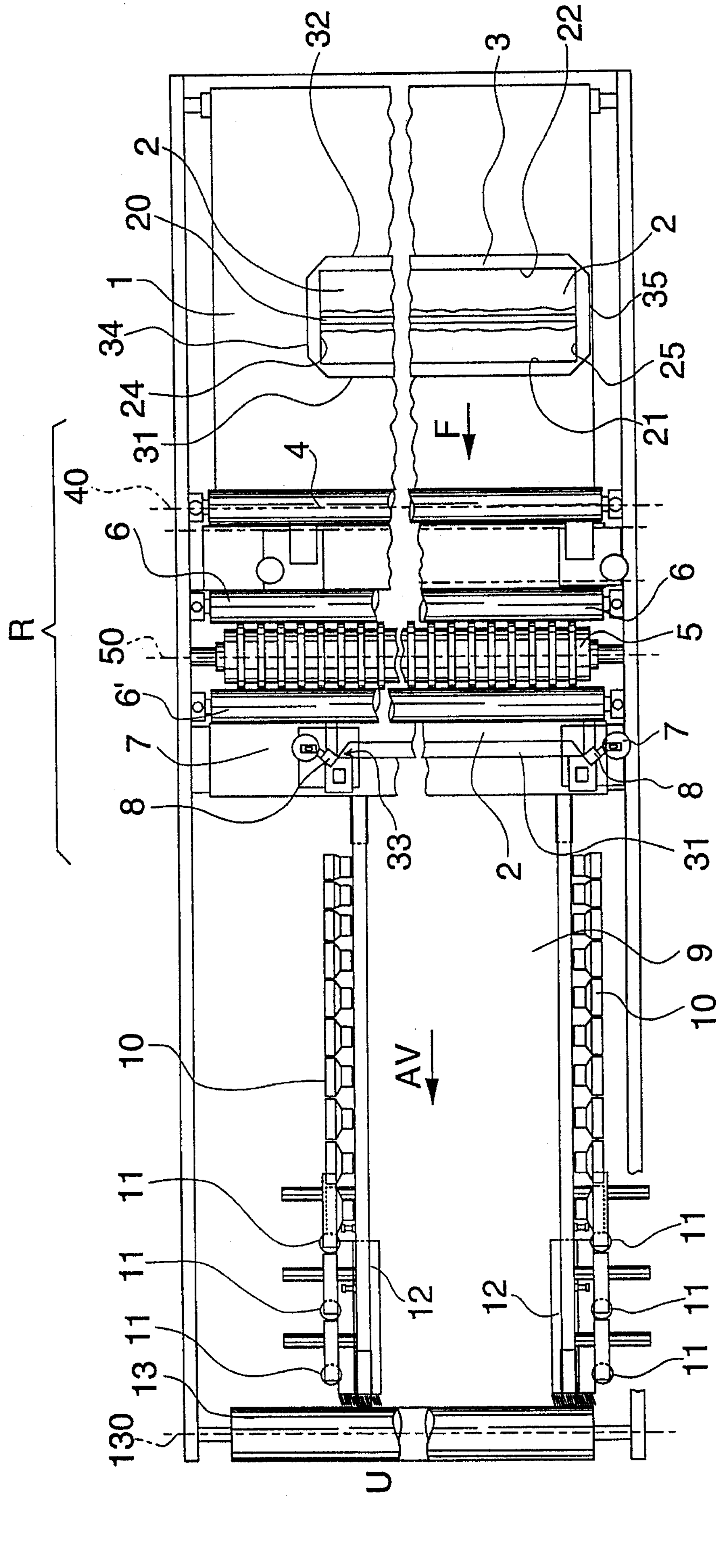
FIG. 1 is an ensemble plan view of a machine according to the invention.
Figure 2:
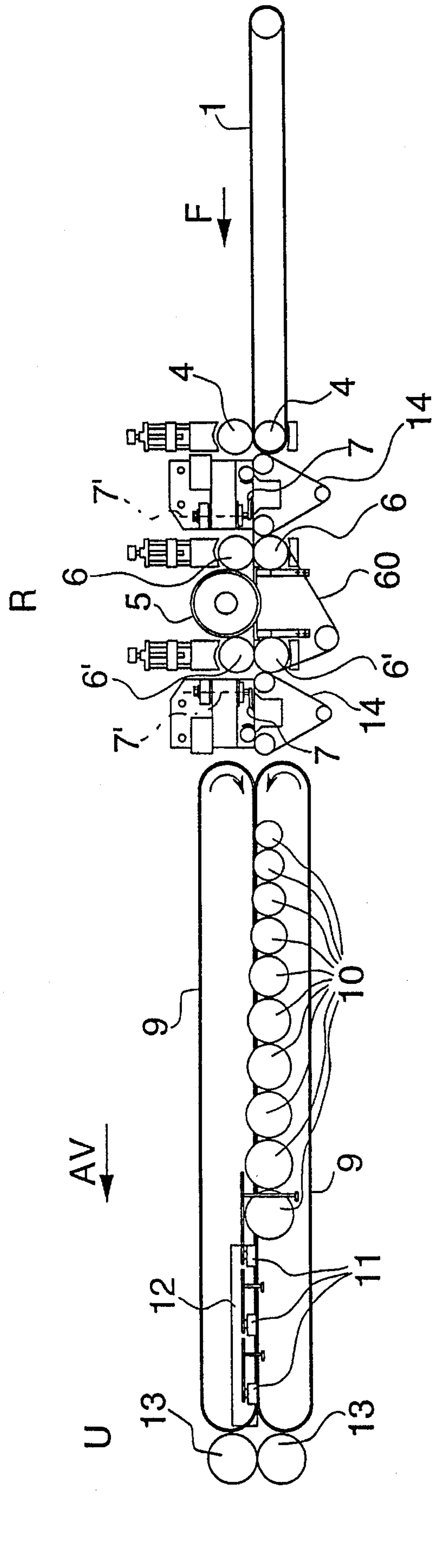
FIG. 2 is a view in longitudinal section of the machine of FIG. 1.

Reduced to its basic structure and reference being made to FIGS. 1 and 2 of the attached drawings, a machine for automatically forming hard folders for bindery, according to the invention, comprises in combination:

a horizontal continuous conveyor belt (1) for individually feeding the frames (2) of the folders with the respective central backbone (20) and relevant lining sheet (3), the lining (3) and frames (2) being placed beforehand superimposed thereon with the interposition of a layer of glue, so that the outer page of the lining (3) will result facing downwardly while resting on the same conveyor (1);

a pair of horizontally juxtaposed rollers (4) for pressing, with reciprocating motion, the lining sheet (3), the frames (2) and the backbone (20) so as to allow for the maximum adhesion thereof, and which are placed in correspondence of the output section of the conveyor (1) and with the respective axes (40) orthogonal to the longitudinal direction thereof;

a brush (5) rotating about a horizontal axis (50) parallel to the axis (40) of the rollers (4), in a direction opposite to that of the motion of the thus obtained pair (2,3), and being located at a height enabling the beating of the first and then of the second protruding trasverse rim (31, 32) of the lining sheet (3) onto the corresponding transverse edges (21, 22).of the cardboard frames (2);

a first pair of horizontally juxtaposed rollers (6) adjacent to the brush (5) and acting merely for driving forwards (F) the said pair (2,3);

a second pair of horizontally juxtaposed rollers (6') located opposite to rollers (6) on the other side of brush (5) and acting merely for driving backwards the pair (2,3): the lower roller of the two pairs of rollers (6,6') cooperating with a multi-channel loop-closed belt (60) for the advancement of said pair (2,3) in a position underlying the brush (5);

two pairs of lever units (7) horizontally oscillating about a vertical axis (7') from an operative position to a neutral position and vice versa, each of said levers (7) being provided with a plate (8) suitably shaped in correspondence of the free end thereof in order to retract a corresponding angular portion (33) of a trasverse rim (31, 32) of the lining protruding from the cardboard frames (2), after the beating thereof, through a coplanar rotation of predetermined amplitude: said units being located two-by-two outwardly adjacent to a corresponding pair of rollers (6, 6');

two pairs of juxtaposed belts (9) forming a flat horizontal loop for driving the pair (2,3) with the transverse rims thus beaten, that is, for moving it away from the beating station (R) by acting in correspondence of the side regions of the frames (2) without the lining sheet (3) being acted upon;

two opposite rows of cascaded bevel wheels, having progressively increased taper in the direction (AV) of the advancement of pair (2,3), and being disposed sideways and externally to the belts (9) to allow for the progressive folding of the longitudinal rims (34, 35) of the lining (3) about the frames (2) as far as to bring them in vertical position;

a plurality of cascaded rollers (11) with vertical axes, which are disposed sideways and outwardly of belts (9) and downstream of wheels (10), so as to press the base portion of the thus rotated longitudinal rims (34, 35) of the lining sheet (3) onto the corresponding rims of the frames (2) and thereby achieving the maximum adhesion thereof;

two vertical shaped plates (12), each of which is disposed outwardly beside a corresponding pair of belts (9), downstream of said wheels (10), for a further rotation through 90° of the longitudinal rims (34, 35) of the lining (3), that is, for a full beating thereof onto the internal longitudinal edges (24, 25) of the cardboard frames (2);

a pair of horizontally juxtaposed rollers (13) whose relevant axes (130) are orthogonal to the direction (AV) of advancement of the pair (2,3) and which are disposed downstream thereof, that is, in correspondence of the output section (U) of the machine, for the pressing of the pair (2,3) with the thus beaten transverse rims (31, 32) and longitudinal rims(34, 35) so as to allow the maximum adhesion thereof.

Figure 3:
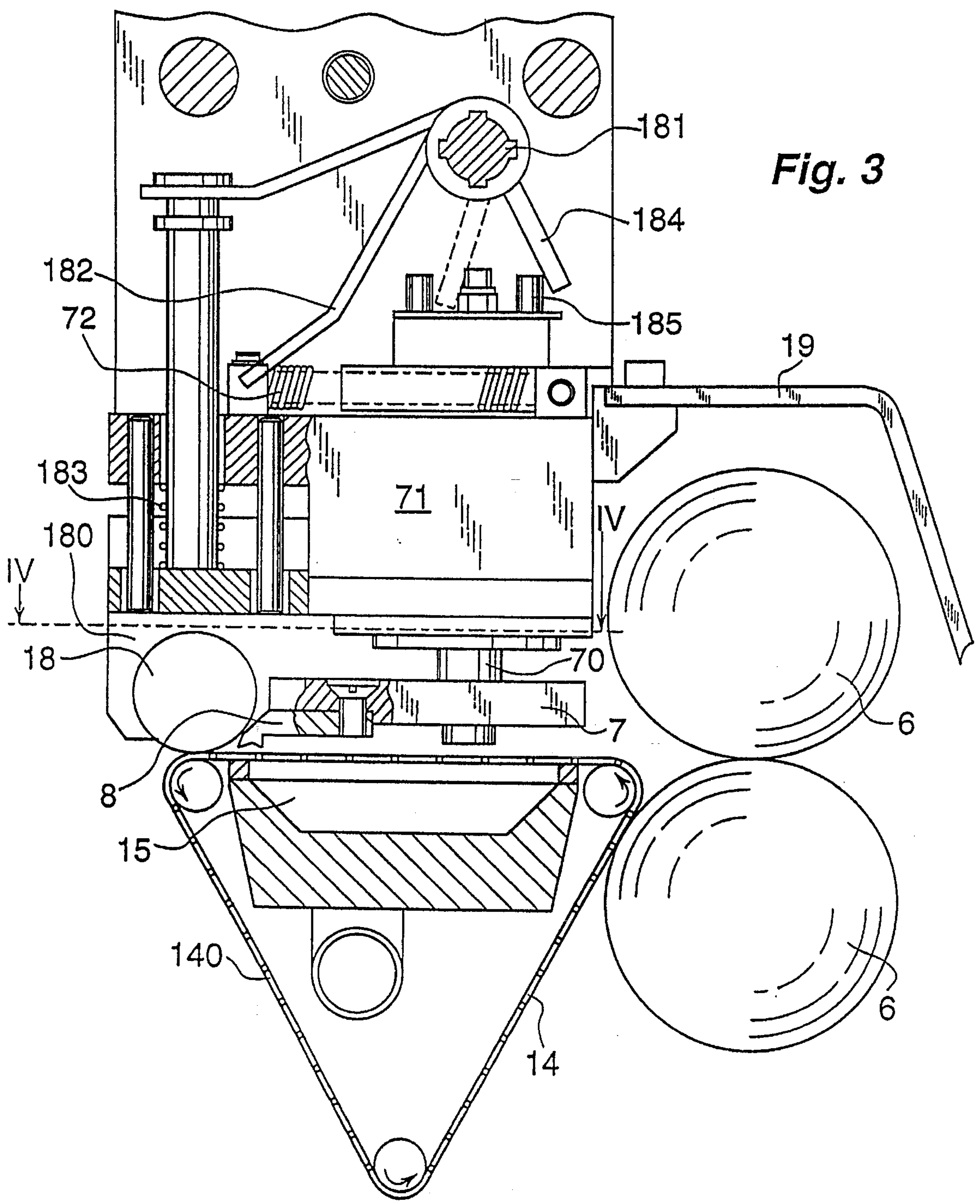
FIG. 3 is a view in longitudinal section showing in detail the means for retracting the angular portion of the trasverse rims of the lining sheet after the respective beating thereof.
Figure 4:
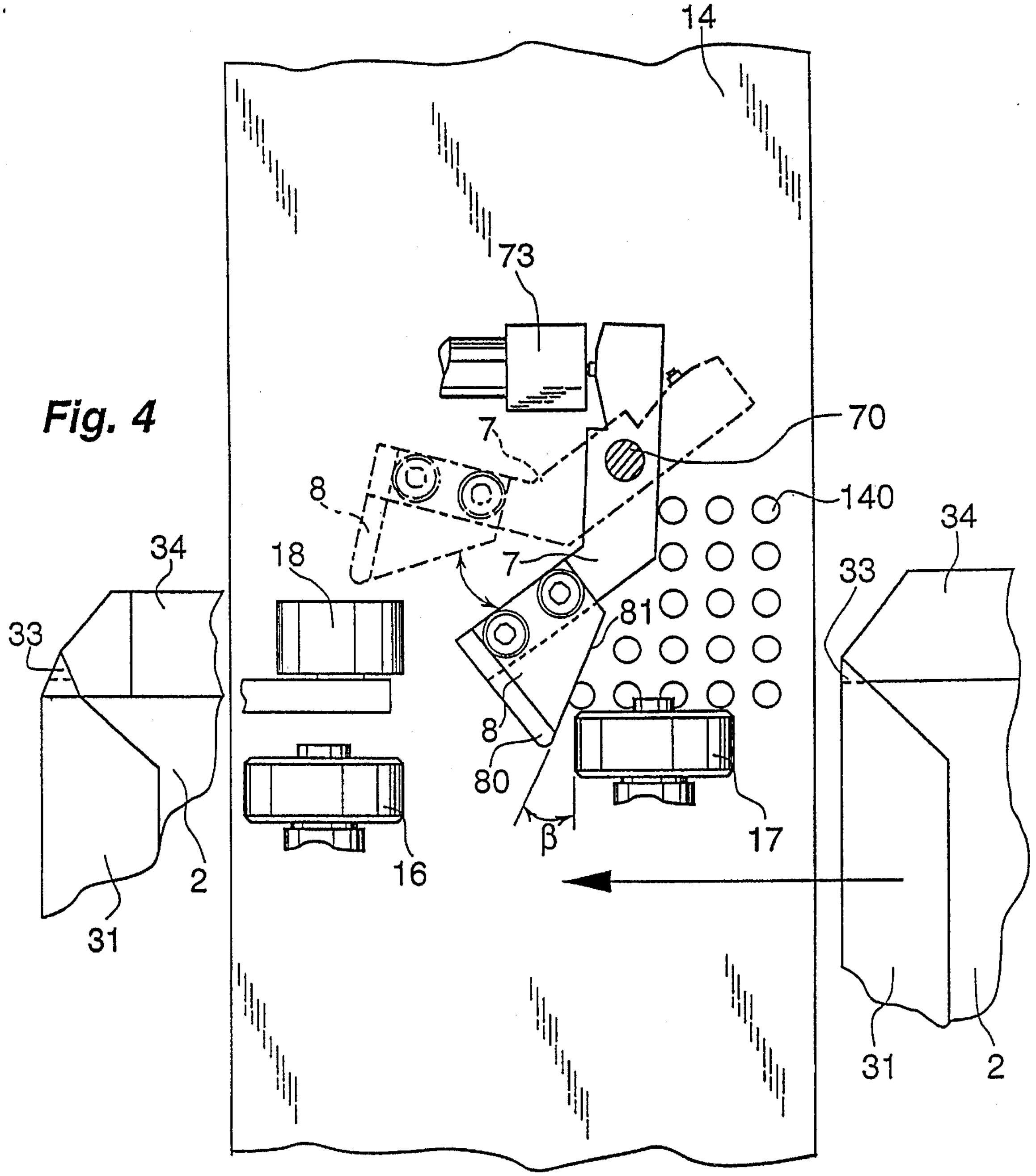
FIG. 4 is a view in section taken on line A—A of FIG. 3.

Advantageously, according to the invention and with reference to FIGS. 3 and 4 of the attached drawings, each of said levers (7) is mounted on top of a loop-closed conveyor belt (14) intended to support the pair (2,3) upon the retraction of the angular portion (33) of the beaten transverse rims (31, 32) of the lining (3), said conveyor being provided with through holes (140) enabling the upper external surface to communicate with a vacuum chamber (15), so as to achieve the maximum adhesion of the longitudinal rims (34, 35) of the lining (3).

Moreover, each lever (7) is advantageously fastened to the lower end of a corresponding shaft (70) having vertical axis and being supported by a body (71) engaged to a spring (72) counteracting the rotation thereof, so as to enable, upon the passage of the pair (2,3), a horizontal resistive force to be transmitted at the end of the corresponding plate (8) and thereby achieving the retraction of the angular portion (33) of the corresponding edge (31) of the lining (3), which is made to protrude out of the respective cardboard frame (2) by the squashing thereof against the latter. A fixed body (73) makes up a stop means over the rear end of the lever (7) to allow the latter to maintain its position upon the passage of the pair (2,3).

Also advantageously provided are two wheels (16, 17) with horizontal axis in correspondence of each lever (7) and at a position overlying the conveyor belt (14), which wheels are vertically and elastically pushed towards the latter to allow in any case the maximum adhesion of the pair (2,3) to the conveyor belt (14).

Moreover, provided in correspondence of each lever (7) is a wheel (18) with horizontal axis to operate the squashing of the corresponding angular portion (33) of the pair (2,3) being retracted: said wheel (18) being supported by a block (180) driven into a vertical displacement by a horizontal shaft (181) which is connected with a first lever (182) acting in correspondence of a contrasting elastic element (183) so as to lower and respectively raise the wheel (18) upon the squashing and respectively release of said angular portion (33) of the lining (3), the same shaft (181) being connected with a second lever (184) acting upon a button (185) connected on top of said body (71) to drive the lever (7) into rotation upon the releasing of said angular portion (33) of the lining (3) after completing the squashing thereof.

According to the invention, each of said plates (8) has advantageously a right trapezoidal shape, with its active front edge (81) being inclined at an angle (β) of predetermined amplitude with respect to a line orthogonal to the feeding direction of the pair (2,3), and with its corresponding lower vertex (80) being beveled.

Advantageously, according to the invention, the amplitude of said angle (β) is between 20° and 30°.

Moreover, advantageously, a shaped plate (19) is provided in one or more elements, with a rim passing below the brush (5), to prevent it from coming in contact with the longitudinal edges (31, 32) of the lining (3).

Figure 6:
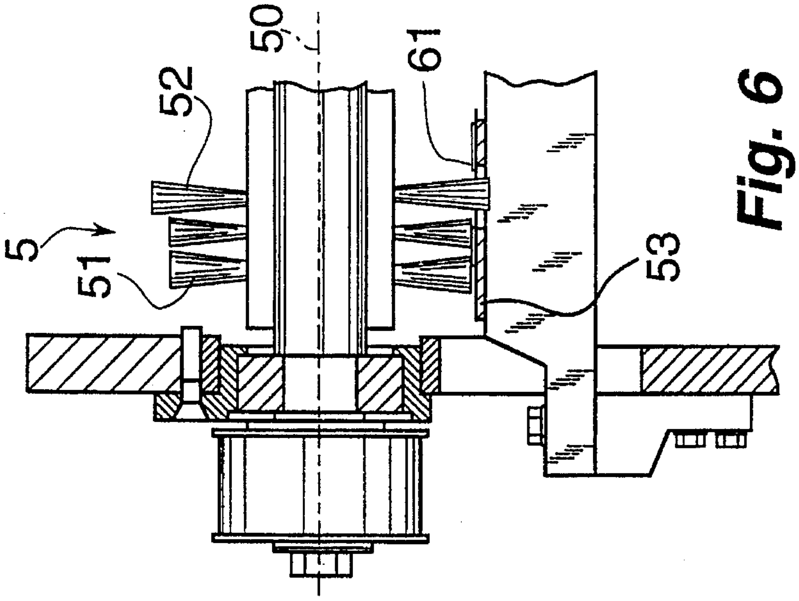
FIG. 6 is a section view taken on line B—B of FIG. 5.
Figure 5:
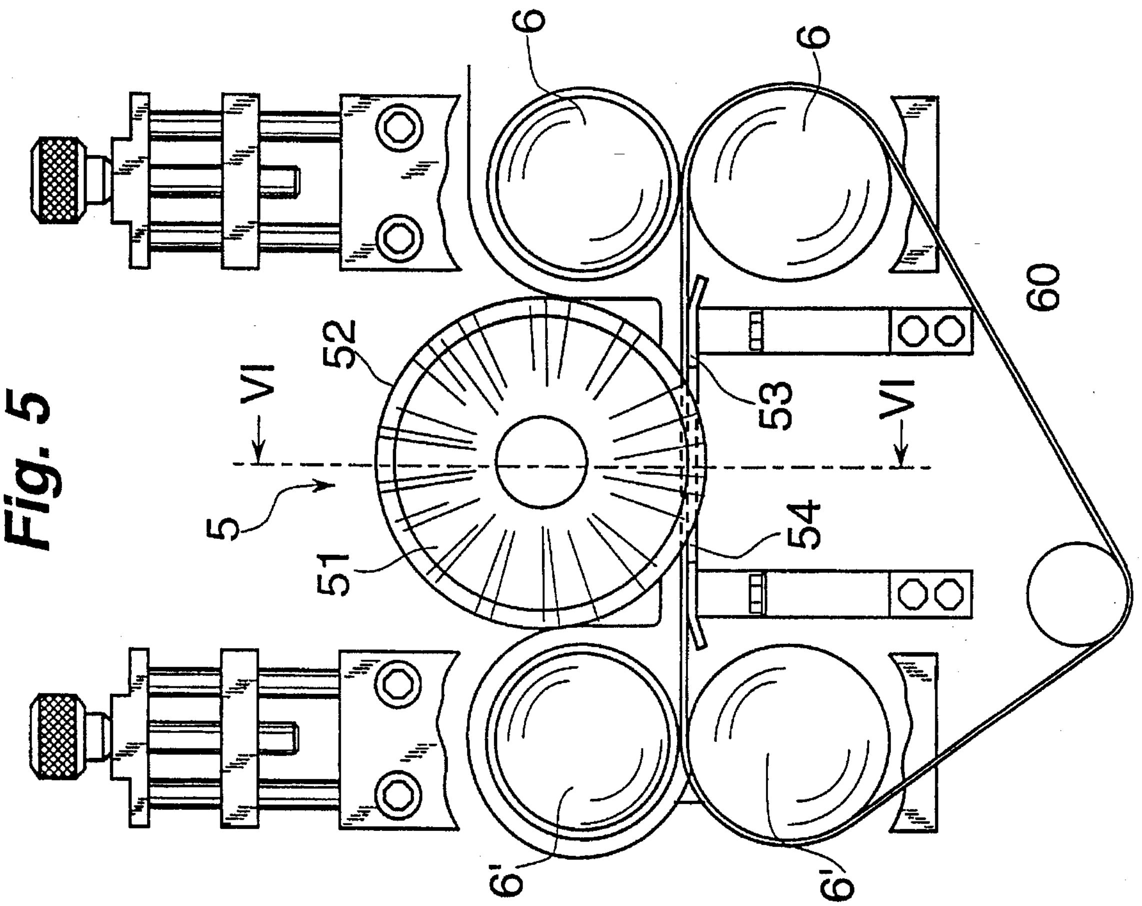
FIG. 5 is a view in longitudinal section showing in detail the means for beating the trasverse rims of the of the lining sheet.

Advantageously, according to the invention and with reference to FIGS. 5 and 6 of the attached drawings, said brush (5) is provided with tufts of bristles (51, 52) distributed according to rings of different radius. The bristles (51) with smaller length being made to graze the belt (60), and the longer ones (52) to pass into corresponding longitudinal channels (61) of the belt (60) and into corresponding longitudinal slots (54) of a plate (53) disposed below the brush (5) and the belt (60), so as to ease the lifting and the beating of the transverse rims (31, 32) of the lining sheet (3).

According to the invention, advantageously, the operative surface of the upper rollers (6, 6') is smooth and provided with a silicon overlay to prevent their sticking to the rims of the lining (3), and the lower rollers (6, 6') are made of steel and provided with a plurality of grooves corresponding to the channels (61) of the belt (60).

The operation of the machine is as follows.

Upon its exit from the feeding belt (1), each pair (2,3) is pressed by the rollers (4), so as to allow for the complete adhesion thereof. Afterwards, the pair (2,3) driven and pressed by the rollers (6) finds itself with its front transverse rim (31) in correspondence of the brush (5). At this point, the bristles (52) lift and beat said rim (31): the beating being completed with the cooperation of the bristles (51). The further advancement of the pair (2,3) allows the intervention of rollers (6') which operate the pressing of the thus beaten rim (31), and the intervention of the plates (8) adjacent to rollers (6'), each of which plates causes the retraction of the corresponding angular portion (33) of the thsu beaten and pressed rim (31). At the end of this operation, the direction of advancement of the pair (2,3) is reversed, after a disengagement of the plates (8) acting on said portions (33), in order to perform the above described operations on the rear transverse rim (32) of the lining (3). Upon its exit from the beating station (R) of the machine, the pair (2,3), with its longitudinal rims (31, 32) thus beaten, is picked up by the belts (9) to allows for the intervention of the bevel wheels (10) which operate the folding of the longitudinal rims (34, 35) of the lining sheet (3) until they are disposed in vertical position. Downstream of the wheels (10), the rollers (11) press the base portion of rims (34, 35) onto the corresponding sides of the cardboard frames (2), and the plates (12) carry out the final beating thereof. The rollers (13) allow the final pressing of the thus formed folder.

According to a first alternative empodiment of the present invention, the belts (9), wheels (10, rollers (11) and plates (12) are mounted in place of the conveyor belt (1) and vice versa, so as to first operate the beating of the longitudinal rims (34, 35) of the lining sheet (3) and, secondly, the beating of the transverse rims (31, 32).

According to a further alternative embodiment, the present machine does not include the means (9, 10, 11, 12) for the longitudinal flanging of ends downstream of rollers (6'). In this case, provision is made for carrying out the beating of said rims (31, 32, 34, 35) in two consecutive interventions. More particularly, provision is made to perform the beating of the transverse rims (31, 32) as above described and, therefore, to pick up the pair (2,3) at its exit from the beating station (R) and turn it through 90° from its initial position, so as to allow the longitudinal rims (34, 35) to replace the transverse rims (31, 32) and make the latter undergo the same treatment.

Moreover, in place of said plate (19), an annular element, not shown for sake of clarity in the accompanying drawings, may be mounted solid to the shaft supporting the brush (5), and whose position is adjustable at will along the axis (50) thereof, so as to prevent it from coming in contact with the longitudinal rims (34, 35) of the lining sheet (3).

Moreover, according to a further alternative embodiment of the invention, in place of said belt (60) a roller opposite and parallel to the brush (5) may be provided to enable the pair (2,3) to be moved upon the beating of the transverse rims (31, 32) of the lining (3).

Again, according to an alternative embodiment of the invention, in place of said wheels (10) provision is made for two corresponding belts, not shown for sake of clarity, and whose active surface, that is the one facing the pair (2,3), is inclined to the horizontal plane by an angle progressively increasing from 0° to 90°, from the output section of the beating station (R) to the section for the input of plates (12) for the beating of the rims (34, 35) of lining (3).

Finally, in place of said plates (12), provision is made for two corresponding brushes consisting of one or more elements, each of which having bristles facing the plane of the pair (2,3) so as to enable the longitudinal rims (34, 35) of the lining (3) to be beaten.

We claim:

1. Machine for automatically forming hard folders for bindery, comprising in that it comprises in combination:

a horizontal continuous conveyor belt for individually feeding the frames of folders with the respective central backbone and relevant lining sheet, the lining and frames being placed beforehand superimposed thereon with the interposition of a layer of glue, so that the outer page of the lining will result facing downwardly while resting on the same conveyor;

a pair of horizontally juxtaposed rollers for pressing, with reciprocating motion, the lining sheet, the frames and the backbone so as to allow for the maximum adhesion thereof, and which are placed in correspondence of the output section of the conveyor and with the respective axes orthogonal to the longitudinal direction thereof;

a brush rotating about a horizontal axis parallel to the axis of the rollers, in a direction opposite to that of the motion of the thus obtained assembly of the lining sheet and the frames, and being located at a height enabling the beating of the first and then of the second protruding transverse rim of the lining sheet onto the corresponding transverse edges of the cardboard frames;

a first pair of horizontally juxtaposed rollers adjacent to the brush and acting merely for driving forwards said assembly of the lining sheet and the frames;

a second pair of horizontally juxtaposed rollers located opposite to rollers on the other side of the brush and acting solely to drive backwards the assembly of the lining sheet and the frames: the lower roller of the two pairs of rollers cooperating with a multi-channel loop-closed belt for the advancement of said assembly of the lining sheet and the frames in a position underlying the brush;

two pairs of lever units horizontally oscillating about a vertical axis from an operative position to a neutral position and vice versa, each of said levers being provided with a plate suitably shaped in correspondence of the free end thereof in order to retract a corresponding angular portion of a transverse rim of the lining protruding from the cardboard frames, after the beating thereof, through a coplanar rotation of predetermined amplitude: said units being located two-by-two outwardly adjacent to a corresponding pair of rollers.

2. Machine for automatically forming hard folders for bindery, comprising:

a horizontal continuous conveyor belt for individually feeding the frames of folders with the respective central backbone and relevant lining sheet, the lining and frames being placed beforehand superimposed thereon with the interposition of a layer of glue, so that the outer page of the lining will result facing downwardly while resting on the same conveyor;

a pair of horizontally juxtaposed rollers for pressing, with reciprocating motion, the lining sheet, the frames and the backbone so as to allow for the maximum adhesion thereof, and which are placed in correspondence of the output section of the conveyor and with the respective axes orthogonal to the longitudinal direction thereof;

a brush rotating about a horizontal axis parallel to the axis of the rollers, in a direction opposite to that of the motion of the thus obtained assembly of the lining sheet and the frames, and being located at a height enabling the beating of the first and then of the second protruding transverse rim of the lining sheet onto the corresponding transverse edges of the cardboard frames;

a first pair of horizontally juxtaposed rollers adjacent to the brush and acting merely for driving forwards said assembly of the lining sheet and the frames;

a second pair of horizontally juxtaposed rollers located opposite to rollers on the other side of the brush and acting solely to drive backwards the assembly of the lining sheet and the frames: the lower roller of the two pairs of rollers cooperating with a multi-channel loop-closed belt for the advancement of said assembly of the lining sheet and the frames in a position underlying the brush;

two pairs of lever units horizontally oscillating about a vertical axis from an operative position to a neutral position and vice versa, each of said levers being provided with a plate suitably shaped in correspondence of the free end thereof in order to retract a corresponding angular portion of a transverse rim of the lining protruding from the cardboard frames, after the beating thereof, by means of a coplanar rotation of predetermined amplitude: said units being located two-by-two outwardly adjacent to a corresponding pair of rollers;

two pairs of juxtaposed belts forming a flat horizontal loop for driving the pair with the transverse rims thus beaten, that is, for moving it away from the beating station by acting in correspondence of the side regions of the frames without the lining sheet being acted upon;

two opposite rows of cascaded bevel wheels, having progressively increased taper in the direction of the advancement of the assembly of the lining sheet and the frames, and being disposed sideways and externally to the belts to allow for the progressive folding of the longitudinal rims of the lining about the frames as far as to bring them in vertical position;

a plurality of cascaded rollers with vertical axes, which are disposed sideways and outwardly of belts and downstream of wheels, so as to press the base portion of the thus rotated longitudinal rims of the lining sheet onto the corresponding rims of the frames and thereby achieving the maximum adhesion thereof;

two vertical shaped plates, each of which is disposed outwardly beside a corresponding pair of belts, downstream of said wheels, for a further rotation through 90° of the longitudinal rims of the lining, that is, for a full beating thereof onto the internal longitudinal edges of the cardboard frames;

a pair of horizontally juxtaposed rollers whose relevant axes are orthogonal to the direction of advancement of the assembly of the lining sheet and the frames and which are disposed downstream thereof, that is, in correspondence of the output section of the machine, for the pressing of the pair with the thus beaten transverse rims and longitudinal rims so as to allow for maximum adhesion thereof.

3. Machine according to claim 1, wherein each of said levers is mounted on top of a loop-closed conveyor belt intended to support the pair upon the retraction of the angular portion of the beaten transverse rims of the lining, said conveyor being provided with through holes enabling the upper external surface to communicate with a vacuum chamber, so as to achieve the maximum adhesion of the longitudinal rims of the lining.

4. Machine according to claim 1, wherein each said lever is fixed to the lower end of a corresponding shaft having vertical axis and being supported by a body engaged to a spring counteracting the rotation thereof, so as to enable, upon the passage of the pair, a horizontal resistive force to be transmitted at the end of the corresponding plate and thereby achieving the retraction of the angular portion of the corresponding edge of the lining, which is made to protrude out of the respective cardboard frame by the squashing thereof against the latter: a stationary body making up a stop means abutting against the rear end of the lever to allow the latter to maintain its position upon the passage of the pair.

5. Machine according to claim 1, further comprising two wheels with horizontal axis in correspondence of each lever and at a position overlying the conveyor belt, which wheels are vertically and elastically pushed towards the latter to allow in any case the maximum adhesion of the pair to the conveyor belt.

6. Machine according to claim 1, further comprising a wheel with horizontal axis to operate the squashing of the corresponding angular portion of the retracted pair: said wheel being supported by a block driven into a vertical displacement by a horizontal shaft which is connected with a first lever acting in correspondence of a contrastive elastic element so as to lower and respectively raise the wheel upon the squashing and respectively release of said angular portion of the lining, the same shaft being connected with a second lever acting upon a button connected on top to said body to drive the lever into rotation upon the releasing of said angular portion of the lining after completing the squashing thereof.

7. Machine according to claim 1, wherein each of said plates is of right trapezoidal shape, with its active front edge being inclined at an angle β of predetermined amplitude with respect to a line orthogonal to the feeding direction of the pair, and with its corresponding lower vertex being beveled.

8. Machine according to claim 7, wherein the amplitude of said angle (β) is between 20° and 30°.

9. Machine according to claims claim 1, further comprising a shaped plate in one or more elements, with a rim passing below the brush, so as to prevent it from coming in contact with the longitudinal edges of the lining.

10. Machine according to claim 1, wherein the said brush is provided with tufts of bristles distributed according to rings of different radius: the bristles with smaller length being made to graze the belt, and the longer ones to pass into corresponding longitudinal channels of the belt and into corresponding longitudinal slots of a plate disposed below the brush and belt, so as to ease the lifting and the beating of the transverse rims of the lining sheet.

11. Machine according to claim 1, wherein the operative surface of the upper rollers is smooth and provided with a silicon overlay to prevent their sticking to the rims of the lining, and the lower rollers are made of steel and provided with a plurality of grooves corresponding to the channels of the belt.

12. Machine according to claim 1, wherein the said plate is provided with an annular element solid to the shaft supporting the brush and whose position is adjustable at will along the axis thereof, so as to prevent it from coming in contact with the longitudinal rims of the lining sheet.

13. Machine according to claim 1, wherein in place of said belt, it comprises a roller facing and parallel to the brush to enable the pair to be moved upon the beating of the transverse rims of the lining.

14. Machine according to claim 2, wherein in place of said wheels, it is provided with two corresponding belts, not shown for sake of clarity, whose active surface, that is the one facing the pair, is inclined to the horizontal plane by an angle progressively increasing from 0° to 90° , from the output section of the beating station R to the section for the input of plates for the beating of the rims of the lining.

15. Machine according to claim 2, wherein in place of said plates, it is provided with two corresponding brushes consisting of one or more elements, each of which having bristles facing the plane of the pair so as to enable the longitudinal rims of the lining to be beaten.

16. Machine according to claim 2, wherein each of said levers is mounted on top of a loop-closed conveyor belt intended to support the pair upon the retraction of the angular portion of the beaten transverse rims of the lining, said conveyor being provided with through holes enabling the upper external surface to communicate with a vacuum chamber, so as to achieve the maximum adhesion of the longitudinal rims of the lining.

17. Machine according to claim 2, wherein each said lever is fixed to the lower end of a corresponding shaft having vertical axis and being supported by a body engaged to a spring counteracting the rotation thereof, so as to enable, upon the passage of the pair, a horizontal resistive force to be transmitted at the end of the corresponding plate and thereby achieving the retraction of the angular portion of the corresponding edge of the lining, which is made to protrude out of the respective cardboard frame by the squashing thereof against the latter: a stationary body making up a stop means abutting against the rear end of the lever to allow the latter to maintain its position upon the passage of the pair.

18. Machine according to claim 2, further comprising two wheels with horizontal axis in correspondence of each lever and at a position overlying the conveyor belt, which wheels are vertically and elastically pushed towards the latter to allow in any case the maximum adhesion of the pair to the conveyor belt.

19. Machine according to claim 2, further comprising a wheel with horizontal axis to operate the squashing of the corresponding angular portion of the retracted pair: said wheel being supported by a block driven into a vertical displacement by a horizontal shaft which is connected with a first lever acting in correspondence of a contrastive elastic element so as to lower and respectively raise the wheel upon the squashing and respectively release of said angular portion of the lining, the same shaft being connected with a second lever acting upon a button connected on top to said body to drive the lever into rotation upon the releasing of said angular portion of the lining after completing the squashing thereof.

20. Machine according to claim 2, wherein each of said plates is of right trapezoidal shape, with its active front edge being inclined at an angle β of predetermined amplitude with respect to a line orthogonal to the feeding direction of the pair, and with its corresponding lower vertex being beveled.

* * * * *